United States Patent [19]
Cooke et al.

[11] Patent Number: 5,561,731
[45] Date of Patent: Oct. 1, 1996

[54] FLEXIBLE CASING FOR OPTICAL RIBBONS

[75] Inventors: Harriet G. Cooke; Terry L. Cooke; Bob L. Bolock, all of Hickory, N.C.

[73] Assignee: Siecor Corporation, Hickory, N.C.

[21] Appl. No.: 491,196

[22] Filed: Jun. 15, 1995

[51] Int. Cl.$^6$ .................................................. G02B 6/44
[52] U.S. Cl. ............................................ 385/114; 385/100
[58] Field of Search ................................. 385/100, 102, 385/109, 114, 113

[56] References Cited

U.S. PATENT DOCUMENTS

| | | | |
|---|---|---|---|
| 4,575,326 | 3/1986 | French | 425/71 |
| 4,699,461 | 10/1987 | Taylor et al. | 385/114 X |
| 5,002,358 | 3/1991 | Beresford | 385/113 |
| 5,201,020 | 4/1993 | Kannabiran | 385/113 |
| 5,319,730 | 6/1994 | Räsänen et al. | 385/114 |

FOREIGN PATENT DOCUMENTS

| | | | |
|---|---|---|---|
| 63-175813 | 7/1988 | Japan | 385/114 |
| 2-137810 | 5/1990 | Japan | 385/114 |
| 2096343 | 10/1982 | United Kingdom . | |

OTHER PUBLICATIONS

English Translation of Japanese Kokai 63–175813, Yasuke Nakano et al, published Jul. 20, 1988.
Fiber Optic Products for Premises Communications, Siecor Corporation 1990, brochure, 2 pp.(No Month).

Primary Examiner—John D. Lee
Attorney, Agent, or Firm—J. David Abernethy

[57] ABSTRACT

A rectangular flexible casing for holding optical fiber ribbons has an inner tube made of low friction material, an outer tube, and flexible tensile fibers between the inner and outer tubes. A vacuum sizing device is used in the manufacture of the inner and outer tubes to shape the tubes and to maintain their dimensional stability. The casing may be used to protect portions of optical fiber ribbons passing from a cable to a connector to complete a connector assembly.

13 Claims, 3 Drawing Sheets

5,561,731

FLEXIBLE CASING FOR OPTICAL RIBBONS

BACKGROUND OF THE INVENTION

The field of the invention is flexible casings for optical fiber ribbons and methods for providing such flexible casings and fiber optic cable assemblies incorporating such flexible casings.

Cable assemblies typically include cables and connectors or other hardware joined to the cables. Protection of some kind is usually provided for the portion of the optical fibers or optical fiber ribbons branched from the cable to the connector or connectors. Tubing or the like provides such protection. The tubing may be needed in the manufacture of cable assemblies or in post-installation network adjustments to accomodate future demands on the network. A device, sometimes called a furcation, is often used to protect the joint between the cable and the tubing.

A prior art rectangular tubing for optical fiber ribbons comprises an inner rectangular tube of polyester material which is surrounded by a layer of loose, flexible aramid fibers and an outer rectangular jacket of polyvinyl chloride material. The inner tube has inner surface dimensions of 0.6 mm in height and 3.2 mm in width and outer surface dimensions of 1.5 mm in height and 3.6 mm in width. The outer tube has outer surface dimensions of 2.5 mm in height and 4.9 mm in width.

To make a cable assembly, the prior art rectangular tubing has been provided over a single optical fiber ribbon. The frictional resistance between the material forming the optical fiber ribbon common coating and the inner rectangular tube of the prior art tubing is such that pushing the ribbon through the inner tube by hand has been impracticable over distances more than a few inches. Therefore, a pulling wire has been attached by adhesive to an end of the ribbon to be inserted and the wire has been pulled by hand, thereby pulling the ribbon through the bore of the inner tube. The time necessary to attach and remove the pulling wire must be allowed for in the prior art method. Further difficulties have been experienced due to the detachment of the pulling wire or breakage or other damage to optical fiber ribbons during the pulling process.

SUMMARY OF THE INVENTION

It is therefore an object of the present invention to provide an improved rectangular flexible casing having a low-friction interior surface to allow long lengths of optical fiber ribbon to be pushed through the casing by hand.

Another object of the invention is to greatly decrease the risk of damage to the optical fiber ribbon during its insertion into the casing.

Still another object of the invention is to reduce the time and expense involved in preparing such casings and optical fiber cable connector assemblies incorporating such casings.

These and other objects are achieved, according to the present invention, by a flexible casing for enclosure of at least one optical fiber ribbon, the casing including an inner flexible tube having a rectangular inner surface whose dimensions are selected so as to receive with only slight clearance the at least one optical fiber ribbon to be inserted therein. The inner tube is made of a plastic material having a relatively low coefficient of friction to facilitate insertion therein by hand of the at least one optical fiber ribbon. An outer flexible tube encloses the inner tube, and a layer of loose flexible tensile members is inserted between both the inner tube and the outer tube such that the tensile members are in engagement with both the inner tube and the outer tube.

To use the improved flexible casing, a length of an optical fiber ribbon having a length of at least 10 cm is separated from other components of an optical fiber cable. In the case of an optical fiber cable having non-ribbonized optical fibers, this step would include ribbonizing a length of at least 10 cm of the optical fibers by use of a ribbonizer such as that disclosed in Ott et al., U.S. Pat. No. 5,160,569. The optical fiber ribbon is inserted into the improved tubing by pushing the optical fiber ribbon by hand through the bore of the inner flexible tube. Such insertion is facilitated by forming the inner flexible tube from a material having a dynamic coefficient of friction with itself of equal to or less than 0.50, and a dynamic coefficient of friction with steel of equal to or less than 0.20. The flexible casing is attached to the cable through a furcation. A fiber optic connector is connected to the layer of loose flexible tensile members, thereby providing a tensile member between the cable and the optical connector. Of course, the flexible casing may be used between two optical connectors.

The inner and outer tubes of the improved tubing are thin, and there is only a minimal clearance between the inner and outer tubes and between the inner tube and the at least one optical fiber ribbon to be inserted therein. Dimensional stability of the tubes is therefore important. Dimensional stability may be achieved by the use of a vacuum sizing device in the inner tube production line between an extruder and a cooling vat. After the inner tube has been formed and cooled, the second rectangular tube is extruded over a plurality of loose, flexible tensile members arranged about the inner tube.

BRIEF DESCRIPTION OF THE DRAWINGS

The preferred embodiments of the invention are described with reference to the following drawings.

DETAILED DESCRIPTION OF THE INVENTION

The present invention will now be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
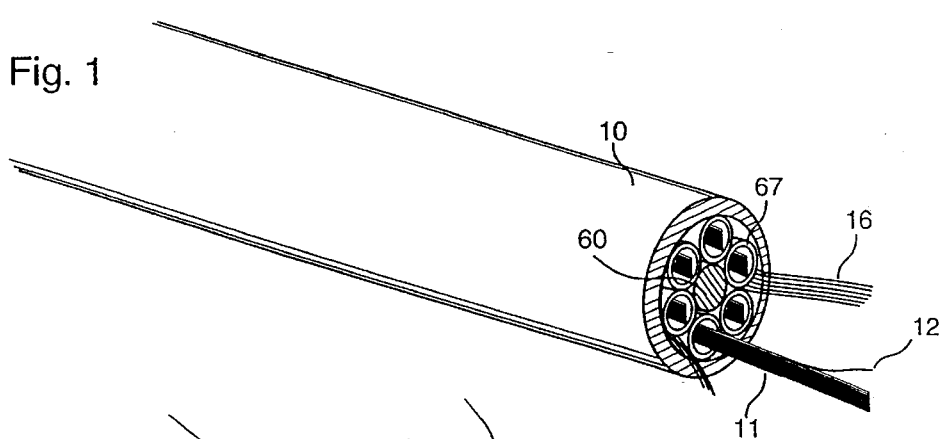
FIG. 1 is a perspective view of a length of optical fiber ribbon emerging from an optical fiber cable.

As shown in FIG. 1, one embodiment of a fiber optic ribbon cable has an outer jacket 10, a central member 60, tensile members such as aramid yarn 16, and one or more tubes 67 carrying one or more optical ribbons 50. The optical ribbons 50 each comprise two or more optical fibers 12 having one or more individual coatings thereon within a common coating 11 of material cured by ultraviolet light. If the cable does not initially hold ribbonized optical fibers, a ribbonizer may be used to apply a rectangular-shaped common coating to the optical fibers. Examples of such ribbonizers are those disclosed in U.S. Pat. No. 5,160,569 and U.S. Pat. No. 5,252,050.

Figure 2:
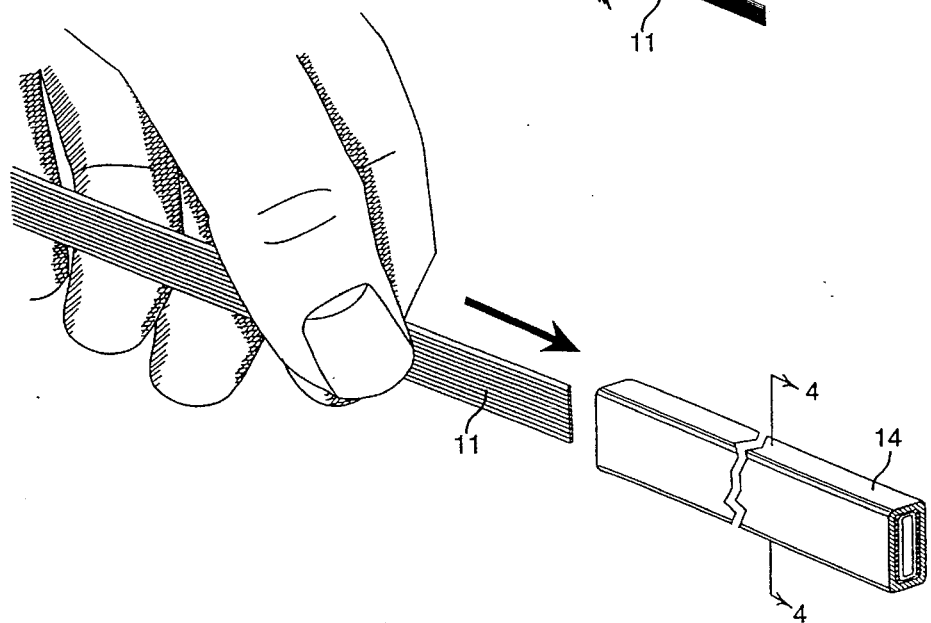
FIG. 2 is a perspective view of hand insertion of an optical fiber ribbon into the flexible casing.
Figure 4:
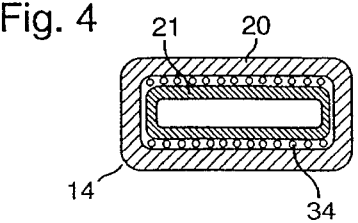
FIG. 4 is a sectional view of the improved casing along line 4—4 of FIG. 2.

The flexible casing 14 according to the invention, as shown in FIGS. 2 and 4, includes a flexible rectangular inner tube 21 made of a material having a relatively low coefficient of friction.. Preferably tube 21 is formed of a material having a dynamic coefficient of friction with steel of equal to or less than 0.20, and a dynamic coefficient of friction with itself of equal to or less than 0.40, such as high density polyethylene. A flexible outer tube 20 made of a plastic material such as polyvinyl chloride surrounds inner tube 21. Between inner tube 21 and outer tube 20 is a layer of loose, flexible tensile members 34, which may, for example, be four bundles of loose, flexible Kevlar® yarn tensile strength members, 1420 denier. As shown in FIG. 4, yarn 34 may be preferably placed only on the wider sides of the inner and outer tubes as considered in cross-section.

Because inner tube 21 has a low coefficient of friction, long lengths of optical fiber ribbon may be pushed within the flexible casing 14 by hand insertion, as shown in FIG. 2. A length of ten cm of optical fiber ribbon may be inserted by hand into flexible casing 14 in the manner shown. Of course, other lengths of ribbon, such as 15 meters or more, may be used as desired.

Figure 3:
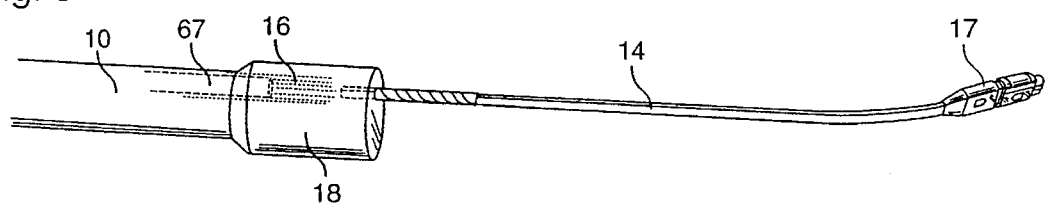
FIG. 3 is a perspective view of a completed connectorized assembly.

Referring to FIG. 3, after the optical fiber ribbon has been inserted into flexible casing 14, flexible casing 14 is encased at one of its terminal ends by a water-impervious plug 18, according to the teachings of U.S. patent application No. 08/190,757, now U.S. Pat. No. 5,425,121. Aramid yarns 16 from the optical cable and aramid yarns 34 from casing 14 are both encased in plug 18 to provide a protected junction between the cable and casing 14. However, plug 18 may replaced by any of a variety of available prior art furcations, and may be secured by a variety of methods such as epoxy, crimping, and heat-shrinkable tubing material. The other terminal end of flexible casing 14 is secured to a fiber optic ribbon connector 17. A preferred method of securing flexible casing 14 to a connector 17 is inserting a short length of the fiber optic ribbon through connector 17, anchoring a rubber "boot" into the rear of connector 17 over the ribbon, inserting epoxy between the connector 17 and the ribbon and tensile members 34 and curing the epoxy around the ribbon and tensile members in the connector. The free end of the connectorized fiber optic ribbon is then polished, and the cable assembly is complete.

Figure 5:
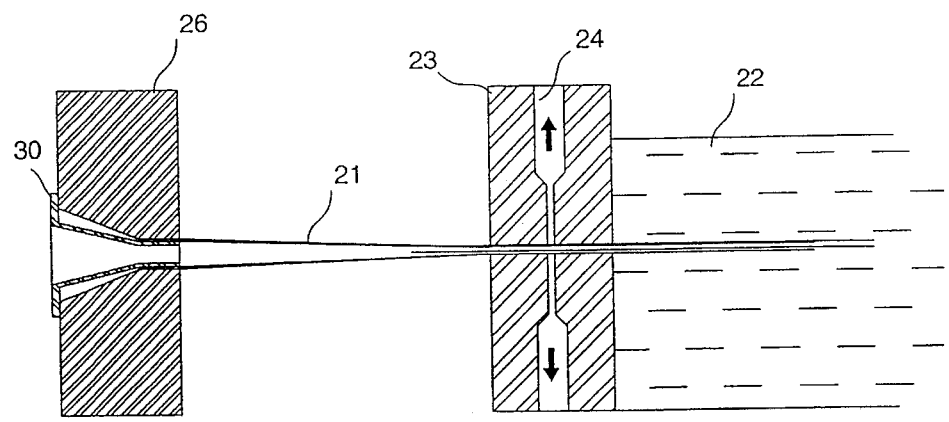
FIG. 5 is a schematic view of a process for making the inner tube.
Figure 6:
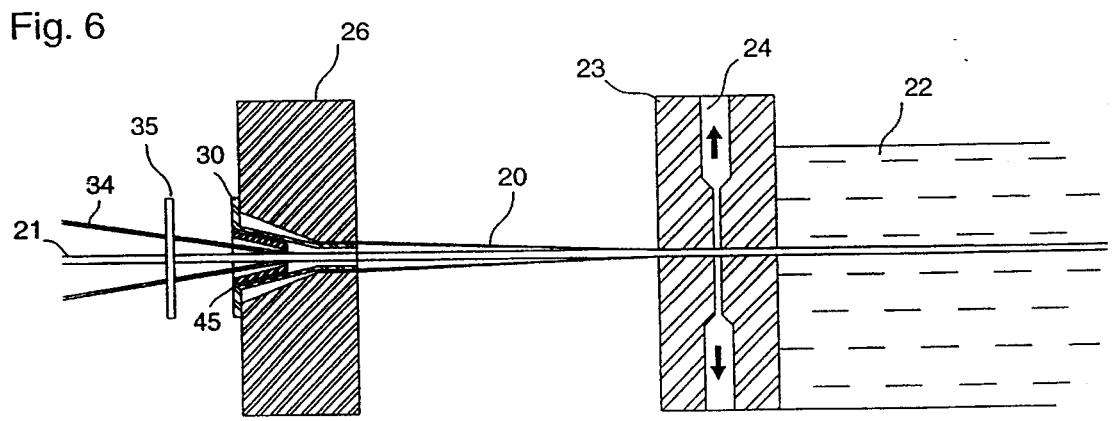
FIG. 6 and 7 are schematic views of a process for completing manufacture of the flexible casing; and, FIG. 8 is a cross-sectional view of the improved casing holding a stack of optical fiber ribbons.
Figure 7:
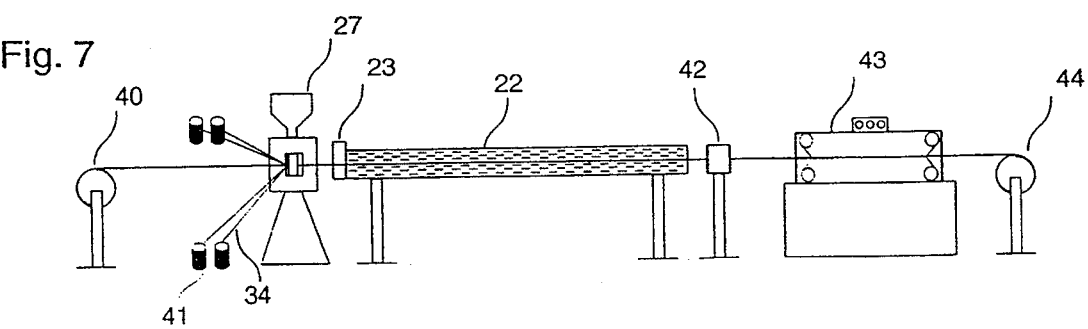

A vacuum sizing unit having a rectangular die shapes the tube and provides dimensional stability during the process of manufacturing the flexible casing according to the invention, as shown in FIGS. 5–7. The first stage of the manufacturing process as depicted in FIG. 5 is making inner tube 21. Inner tube 21 is first extruded to have a cylindrical shape using die 26 and tip 30. Tube 21 is then passed through vacuum sizing device 23 to impart a rectangular shape to tube 21. A pump, not shown, creates a partial vacuum by pulling air in the direction of the arrows shown in the vertically oriented slots 24 in unit 23. Tube 21 then passes through a cooling vat 22 containing a coolant such as water. Any water which passes upstream along tube 21 toward the extruder is drawn off by the partial vacuum. Tube 21 then passes through a belt pulling device and is wound on a take-up reel.

The second stage of the manufacturing process is shown in FIGS. 6 and 7. Inner tube 21 is fed from payoff 40 and is drawn through a hole in the center of layplate 35. Four 1450 denier yarns of aramid fiber tensile members 34 are also drawn through holes in layplate 35, with two being above tube 21 and two being below tube 21 as shown in FIG. 4 and 7. Tube 21 and tensile members 34 pass through the interior of closing die 45, and extruder 27 extrudes outer tube 20 thereover between extruder tip 30 and extruder die 26. Vacuum sizing device 23 and cooling vat 22 are again used as in the first stage of the manufacturing process as described above. The flexible casing then passes through a forced air device 42 to remove remaining water, belt pulling device 43, and onto take-up 44.

Because much of the processing equipment is the same for the first stage and second stage of the manufacturing process, a single line may be used for both. Commonly used equipment may include extruder 27, a vacuum sizing device 23 having sets of tooling of appropriate dimensions, cooling vat 22, forced air device 42, and belt pulling device 43.

Figure 8:
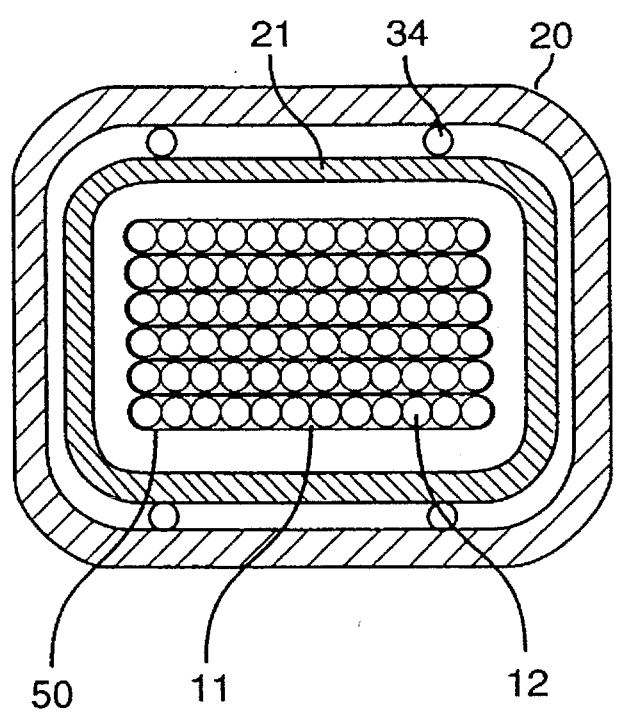

To complete the improved casing holding a stack of optical fiber ribbons as shown in FIG. 8, multiple optical fiber ribbons are inserted through the inner tube by hand in a manner like that shown in FIG. 2. Each ribbon 50 of FIG. 8 contains twelve optical fibers 12 embedded in ribbon common coating 11.

Table 1 below presents two examples of the improved casing which were made, each holding a single optical fiber ribbon.

TABLE 1

| Casing parameters with a single optical ribbon inserted | | |
|---|---|---|
| | Example 1 | Example 2 |
| Ribbon exterior dimensions, mm | | |
| height | 0.28 | 0.28 |
| width | 3.2 | 3.2 |
| Inner tube | | |
| material | HDPE | HDPE |
| dimensions, mm | | |
| exterior height | 1.30 | 1.2 |
| exterior width | 4.00 | 4.0 |
| wall thickness | 0.30 | 0.3 |
| bore height | 0.7 | 0.6 |
| bore width | 3.4 | 3.4 |
| temperature profile, 0° C. | 175–200 | 175–200 |
| Outer tube | | |
| material | PVC | PVC |
| dimensions, mm | | |
| exterior height | 2.5 | 2.5 |
| exterior width | 4.8 | 4.8 |
| wall thickness | 0.4 | 0.4 |
| bore height | 1.7 | 1.7 |
| bore width | 4.0 | 4.0 |
| temperature profile, °C. | 150–181 | 155–180 |

TABLE 2

Coefficients of Friction of Inner Tube Materials

| Material | Static COF with itself | Static COF with steel | Dynamic COF with itself | Dynamic COF with steel |
|---|---|---|---|---|
| Polyester (prior art) | not applicable | not applicable | sticks | 0.24 |
| HDPE | 0.34 ± 10% | 0.24 ± 10% | 0.30 ± 10% | 0.15 ± 10% |

EXAMPLE 1

An inner tube having a generally rectangular shape with rounded corners was formed of high density polyethylene plastic material (HDPE). The inner tube formed of HDPE material is superior to the polyester inner tube according to the prior art because of the higher melt strength and the lower coefficient of friction of the HDPE material. The higher melt strength allows the thin-walled tubing to be extruded in long lengths without breakage. The casing according to the prior art, in contrast, was commercially available only in lengths of around one meter. The HDPE material had a static coefficient of friction with itself of 0.34±10%, a static coefficient of friction with steel of 0.24±10%, a dynamic coefficient of friction with itself of 0.30±10%, and a dynamic coefficient of friction with steel of 0.15±10%. The HDPE material also does not stick to the PVC outer tube during processing.

The inner tube delimited an interior bore having a height of 0.7 mm plus or minus 0.2 mm and a width of 3.4 mm plus 0.2 mm, minus 0.0 mm. The tube had an exterior height of 1.30 mm plus or minus 0.1 mm, and an exterior width of 4.00 mm plus or minus 0.1 mm, with a 0.30 mm wall thickness on all sides. Each inner corner radius of curvature was 0.15 mm, and each outer corner radius of curvature was 0.25 min.

A ⅙ cross head on a 30 mm extruder was used having a tip having a round outer diameter of 2.82 mm and a die having a round inner diameter of 3.44 mm. A standard metering screw was used and the extruder temperature profile was 175° C. to 200° C. The screw speed was 9.6 rpm and the line speed was 6.4 m/min. After an air gap of 1 inch, the extruded HDPE entered a vacuum sizing device to give the tube its rectangular shape and to stabilize its dimensions. The HDPE was then immediately introduced into a cooling vat holding water at a temperature of 15° C. Thereafter the tube was led through a forced air water removal device, a belt pulling device, and onto a take-up spool.

An outer tube made of polyvinyl chloride material (PVC) was extruded by a 30 mm extruder over the inner tube and aramid fiber yarns. The outer tube delimited an interior bore having a height of 1.7 mm and a width of 4.0 mm. The external dimensions of the outer tube were 4.80 mm by 2.5 mm with a 0.40 mm wall thickness.

A lay plate was positioned three inches before the back entrance of the crosshead to guide the aramid yarn and inner tube into the die and to keep the yarns from crossing over each other. A rectangular pressure tip was used as a closing die in the back of the crosshead to hold the aramid yarns in position. The aramid fiber yarns used were 4×1420 denier Kevlar yarns. Back tension was applied to the inner tube payoff and the aramid yarn payoffs.

The extruder temperature profile was 150° C. to 181° C. The screw speed was 30.0 rpm and the line speed was 11.6 m/min. The water temperature in the cooling vat was 22° C.

A talc applicator was positioned between the payoffs for the inner tube and aramid yarns and the crosshead extruder. The setting on the talc applicator was very low to avoid clogging the tip with talc. A lay plate was positioned on each end of the talc applicator. The lay plate at the applicator exit was three inches from the back entrance of the crosshead.

At the startup of the processing line, the aramid yarns were threaded though the layplate, the crosshead, and a water trough, and onto a belt pulling apparatus. The extruder was then started and PVC material was extruded over the aramid yarns. After the jacket reached the belt pulling apparatus, the vacuum sizing unit was closed and the vacuum pump was started. The inner tube was then threaded through the lay plate and into the back of the crosshead.

An optical fiber ribbon having external dimensions of 0.28 mm in height and 3.2 mm in width was easily fed through a section of the completed casing having a length of fifteen meters.

EXAMPLE 2

Process parameters were generally the same as in example 1, except that the dimensions of the inner tube were reduced. The exterior height of the inner tube was 1.2 mm, the exterior width was 4.0 mm, the wall thickness was 0.3 mm, the bore height was 0.6 mm, and the bore width was 3.4 mm. This slight size reduction was sufficient to make use of a talc applicator unnecessary, as the aramid yarns did not adhere excessively to the outer tube.

Table 2 below presents examples 3 and 4 of the improved inner tube which were made, each holding a stack comprising a plurality of optical fiber ribbons. No outer jacket or aramid yarns were applied in examples 3 and 4. Example 5 presents anticipated parameters for a complete improved casing holding a stack comprising a plurality of optical fiber ribbons.

TABLE 3

Casing parameters with multiple optical ribbons inserted

| | Example 3 | Example 4 | Example 5 |
|---|---|---|---|
| Ribbon | | | |
| # of ribbons | ten | ten | six |
| exterior dimensions of single ribbon, mm | | | |
| height | 0.3 | 0.3 | 0.3 |
| width | 1.04 | 1.04 | 3.1 |
| exterior dimensions of ribbon stack, mm | | | |
| height | 3.2 | 3.2 | 1.8 |
| width | 1.04 | 1.04 | 3.1 |
| Inner tube | | | |
| material | HDPE | HDPE | HDPE |
| dimensions, mm | | | |
| exterior height | 1.7 | 1.45 | 3.0 |
| exterior width | 4.2 | 3.8 | 4.2 |
| wall thickness | 0.2 | 0.2 | 0.3 |
| bore height | 1.3 | 1.05 | 2.1 |
| bore width | 3.8 | 3.4 | 3.4 |
| temperature profile, °C. | 175–200 | 175–200 | 175–200 |
| Outer tube | N/A | N/A | |
| material | | | PVC |
| dimensions, mm | | | |
| exterior height | | | 4.3 |

TABLE 3-continued

Casing parameters with multiple optical ribbons inserted

|  | Example 3 | Example 4 | Example 5 |
| --- | --- | --- | --- |
| exterior width |  |  | 5.05 |
| wall thickness |  |  | 0.4 |
| bore height |  |  | 3.5 |
| bore width |  |  | 4.3 |
| temperature profile, °C. |  |  | 155–180 |

EXAMPLE 3

An inner tube made of the same HDPE material of examples 1 and 2 was extruded having an exterior height of 1.7 mm, an exterior width of 4.2 mm, a wall thickness of 0.2 mm, a bore height of 1.3 mm, and a bore width of 3.8 mm. The extruder temperature profile was 175° C. to 200° C. A stack of ten optical fiber ribbons each having a height of 0.3 mm and a width of 1.04 mm was provided, the ribbon stack having a height of 3.2 mm and a width of 1.04 mm. A length of one inch of the ribbon stack was inserted by hand into the inner tube, with the inner tubing oriented such that the bore width accommodated the ribbon stack height. Only one inch of the inner tubing was required in this example, and no outer tube was required. When only such a short length of inner tubing was required, the dimensions of the inner tube could be decreased, as in the following example.

EXAMPLE 4

An inner tube made of the same HDPE material of examples 1, 2, and 3 was extruded having an exterior height of 1.45 mm, an exterior width of 3.8 mm, a wall thickness of 0.2 mm, a bore height of 1.05 mm, and a bore width of 3.4 ram. The extruder temperature profile was 175° C. to 200° C. A stack of ten optical fiber ribbons each having a height of 0.3 mm and a width of 1.04 mm was provided, the ribbon stack having a height of 3.2 mm and a width of 1.04 mm. A length of one inch of the ribbon stack was inserted by hand into the inner tube, with the inner tubing oriented such that the bore width accommodated the ribbon stack height. No outer tube was required in this example.

EXAMPLE 5

The following are anticipated parameters to be used in making an improved casing as shown in FIG. 8 without the use of a talc applicator for an insertion distance of 30 inches of the ribbon stack into the inner tube. An inner tube 21 made of the same HDPE material of examples 1 and 2 is to be extruded having an exterior height of 3.0 ram, an exterior width of 4.2 mm, a wall thickness of 0.3 mm, a bore height of 2.1 mm, and a bore width of 3.4 mm. The extruder temperature profile is to be 175° C. to 200° C. A stack of six optical fiber ribbons 50 each having a height of 0.3 mm and a width of 3.1 mm is to be provided, the ribbon stack having a height of 1.8 mm and a width of 3.1 mm. The bore height is 0.3 mm greater than the ribbon stack height and the bore width is 0.3 mm greater than the ribbon stack width to allow a clearance of 0.15 mm on all four sides of a ribbon stack centered within the inner tube bore.

An outer tube 20 is to be made of the same PVC material of examples 1–4 is to be extruded having an exterior height of 4.3 ram, an exterior width of 5.1 mm, a wall thickness of 0.4 mm, a bore height of 3.5 mm, and a bore width of 4.3 mm. The temperature profile of the extruder is to be 155° C. to 180° C.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A flexible casing for enclosure of at least one optical fiber ribbon, comprising:

an inner flexible tube having a generally rectangular inner surface whose dimensions are selected so as to receive said at least one optical fiber ribbon with a clearance of less than 1 mm on each side of said at least one optical fiber ribbon, said inner tube made of a plastic material having a relatively low coefficient of friction;

an outer flexible tube enclosing said inner tube; and, a layer of flexible tensile strength members between and in engagement with both the inner tube and the outer tube.

2. A flexible casing as set out in claim 1, wherein said inner tube is made of a plastic material having a dynamic coefficient of friction with steel of equal to or less than 0.20.

3. A flexible casing as set out in claim 1, wherein said inner tube is made of a plastic material having a dynamic coefficient of friction with itself of equal to or less than 0.40.

4. A flexible casing as set out in claim 1, wherein the outer flexible tube is generally rectangular in shape.

5. A flexible casing as set out in claim 1, further comprising an optical connector attached to at least one end of the optical fiber ribbon.

6. A flexible casing as set out in claim 1, further comprising an optical connector attached to both ends of the optical fiber ribbon.

7. A flexible casing for enclosure of a stack of optical fiber ribbons, comprising:

an inner flexible tube having a generally rectangular inner surface whose dimensions are selected so as to receive said stack of optical fiber ribbons with a clearance of less than 1 mm on each side of said stack of optical fiber ribbons, said inner tube made of a plastic material having a relatively low coefficient of friction;

an outer flexible tube enclosing said inner tube; and, a layer of flexible tensile strength members between and in engagement with both the inner tube and the outer tube.

8. A flexible casing as set out in claim 7, wherein said inner tube is made of a plastic material having a dynamic coefficient of friction with steel of equal to or less than 0.20.

9. A flexible casing as set out in claim 7, wherein said inner tube is made of a plastic material having a dynamic coefficient of friction with itself of equal to or less than 0.40.

10. A method for providing an optical fiber ribbon assembly, comprising:

providing a optical fiber ribbon having a generally rectangular cross-section and a length of at least 10 cm;

providing a protective casing for the optical fiber ribbon, said casing comprising an inner flexible tube having a generally rectangular inner surface delimiting a bore whose dimensions are selected so as to receive said optical fiber ribbon with a clearance of less than 1 mm on each side of said optical fiber ribbon, said inner tube made of a plastic material having a relatively low coefficient of friction to facilitate insertion therein by hand of said optical fiber ribbon; an outer flexible tube enclosing said inner tube; and, a layer of loose flexible tensile strength members between and in engagement with both the inner tube and the outer tube;

pushing the optical fiber ribbon by hand through the bore of the inner flexible tube; and, attaching an optical connector to the layer of loose flexible tensile members.

11. A method of making a flexible casing for holding at least one optical fiber ribbon, comprising:

extruding a first tube formed of a material having a relatively low coefficient of friction to facilitate insertion therein by hand of said at least one optical fiber ribbon;

passing the first tube through a vacuum sizing device to impart a generally rectangular cross-sectional shape to the first tube;

cooling the first generally rectangular tube; and, extruding a second tube over a plurality of tensile strength members and the cooled first rectangular tube.

12. A method of making a flexible casing as set out in claim 11, further comprising passing the second tube through a vacuum sizing device to impart a generally rectangular cross-sectional shape to the second tube.

13. A method for providing an optical fiber ribbon cable assembly, comprising: providing a portion of a rectangular optical fiber ribbon extending from a cable, said portion having a length of at least 10 cm;

providing a protective casing for the optical fiber ribbon, said casing comprising an inner flexible tube having a rectangular inner surface delimiting a bore whose dimensions are selected so as to receive said optical fiber ribbon with a clearance of less than 1 mm on each side of said optical fiber ribbon, said inner tube made of a plastic material having a relatively low coefficient of friction to facilitate insertion therein by hand of said optical fiber ribbon; an outer flexible tube enclosing said inner tube; and, a layer of loose flexible tensile strength members between and in engagement with both the inner tube and the outer tube; and, pushing the optical fiber ribbon portion by hand through the bore of the inner flexible tube.

* * * * *

UNITED STATES PATENT AND TRADEMARK OFFICE
CERTIFICATE OF CORRECTION

PATENT NO. : 5,561,731

DATED : October 1, 1996

INVENTOR(S) : Harriet G. Cooke, Terry L. Cooke and Bob L. Bolick

It is certified that error appears in the above-identified patent and that said Letters Patent is hereby corrected as shown below:

On the title page, item [75]:

The inventor's name "Bob L. Bolock" is changed to "Bob L. Bolick".

Signed and Sealed this

Twenty-fifth Day of February, 1997

Attest:

BRUCE LEHMAN

*Attesting Officer*  *Commissioner of Patents and Trademarks*